Aug. 13, 1940.  H. CHRISTENSEN  2,211,407
PORTABLE VAPORIZER
Filed Nov. 3, 1938  2 Sheets-Sheet 1
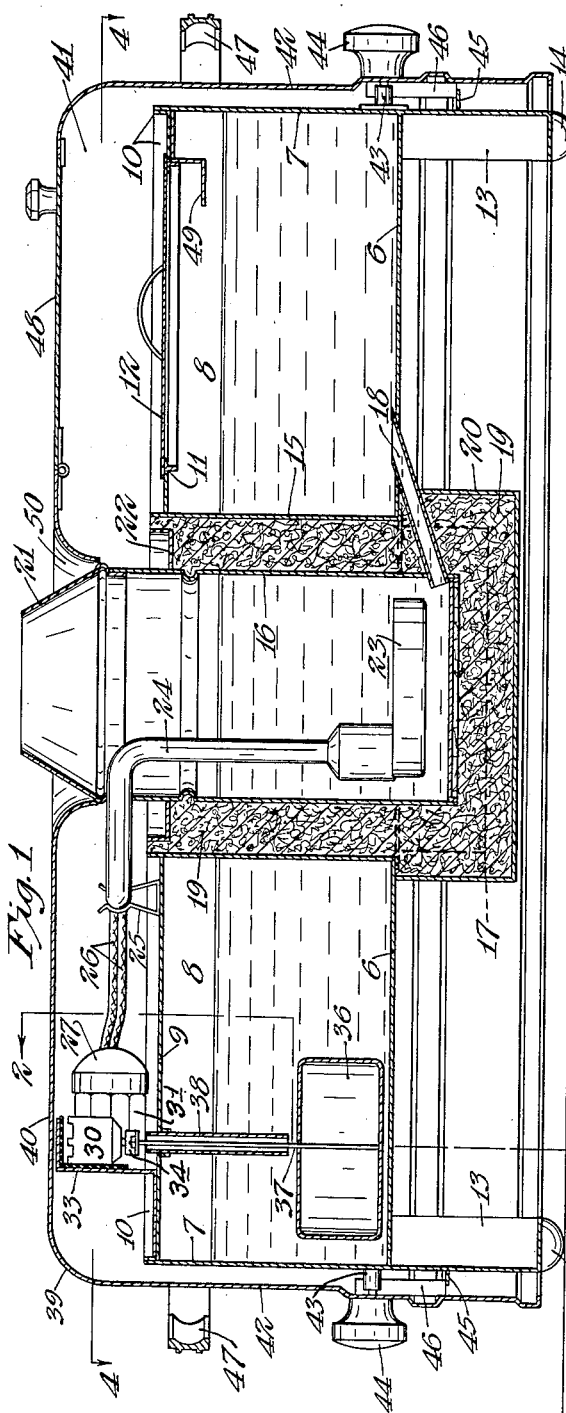
Inventor
Harley Christensen
By Stryker & Stryker
Attorneys Aug. 13, 1940.  H. CHRISTENSEN  2,211,407
PORTABLE VAPORIZER
Filed Nov. 3, 1938  2 Sheets-Sheet 2
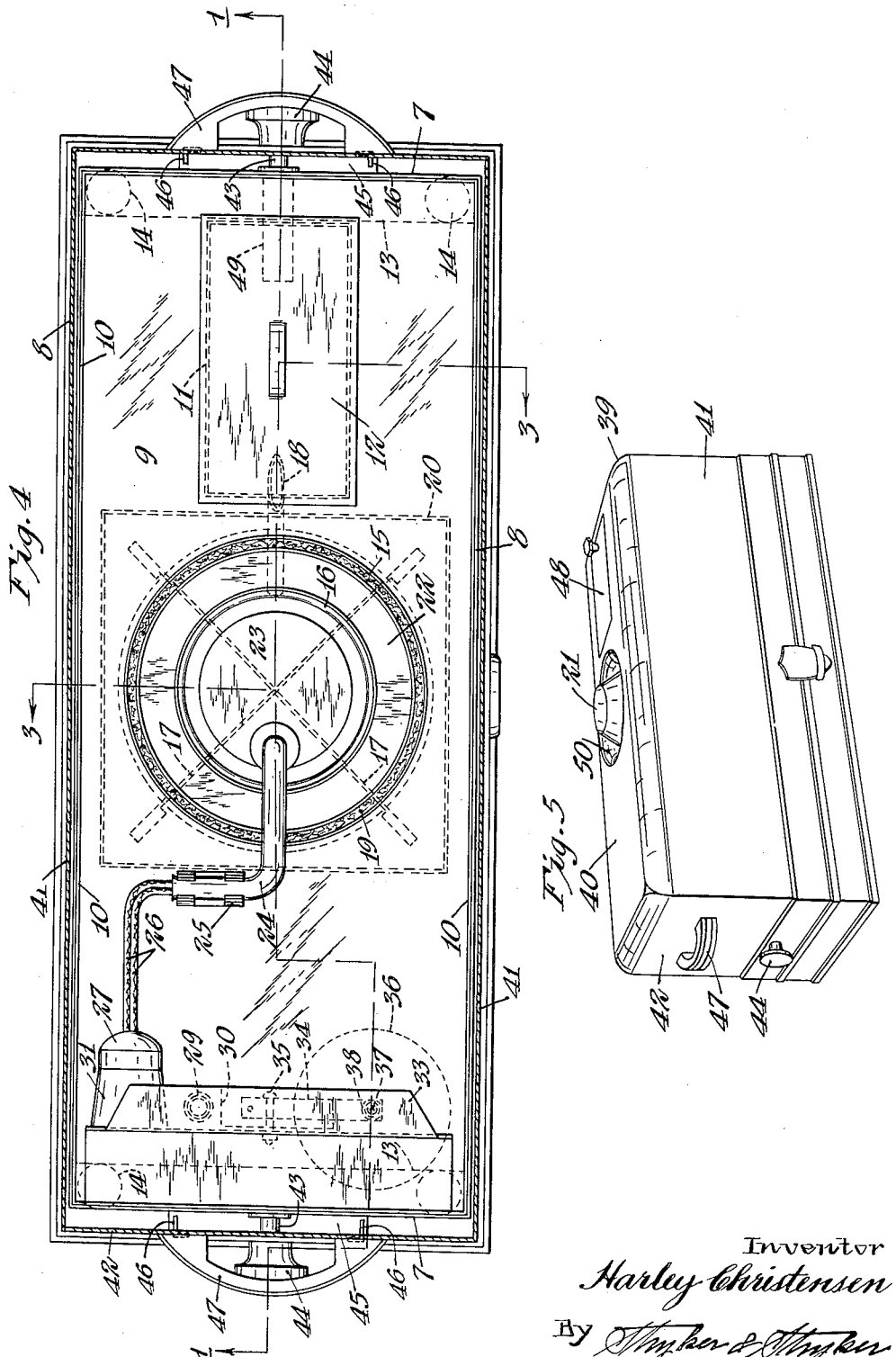
Inventor
Harley Christensen
By Stryker & Stryker
Attorneys Patented Aug. 13, 1940

2,211,407

UNITED STATES PATENT OFFICE 2,211,407

PORTABLE VAPORIZER

Harley Christensen, Minneapolis, Minn., assignor to Mayflower-Lewis Corporation, St. Paul, Minn., a corporation of Ohio Application November 3, 1938, Serial No. 238,601

6 Claims. (Cl. 219—38)

This invention relates to a portable vaporizer for raising the humidity and administering inhalants in sick rooms either in homes or in hospitals.

It is an object of the invention to provide a vaporizer of this class having novel safeguards against burns to patients or attendants and damage resulting from careless use.

A particular object is to provide, in a device of this kind, a compact reservoir and boiler requiring a minimum of attention, adapted to be readily moved about without spilling the contents and so constructed that accidental contact with any hot portion of the device is effectively guarded against.

Another object is to protect a device of this kind against damage from failure of an attendant to fill the reservoir by providing an electric heater and a float operated control therefor whereby upon the reduction of the water level in the reservoir to a predetermined level the current supply for the heater is automatically cut off.

A further object is to provide an unusually efficient and compact vaporizer enclosed within a guard housing of simple and ornamental design.

Other objects will appear and be more fully pointed out in the following specification and claims.

Referring to the accompanying drawings:

Figure 1 is a vertical section, taken on the line 1—1 of Fig. 4, through my improved vaporizer;

Fig. 2 is a vertical section taken on the line 2—2 of Fig. 1;

Fig. 3 is a vertical section taken on the line 3—3 of Fig. 4;

Fig. 4 is a horizontal section taken on the line 4—4 of Fig. 1, and

Fig. 5 is a perspective view of the device.

My device has an oblong reservoir provided with a normally horizontal bottom 6, vertical end walls 7, vertical side walls 8 and a horizontal top 9. This top is offset downward from the upper edges of the side and end walls to provide a shallow tray 10 adapted to drain into a filling opening 11 having a removable closure 12. The reservoir is supported on legs 13 with a resilient foot piece 14 beneath each of the four corners. Extending from the top to the bottom of the reservoir is a cylindrical casing 15 for a boiler 16, the casing 15 being spaced from the side walls 8 and end walls 7 of the reservoir so that it is normally surrounded by the water in the reservoir.

The boiler 16 is supported in spaced relation to the casing 15 on a pair of brackets 17 attached to the bottom of the reservoir and the boiler projects substantially below the bottom of the reservoir. Water is supplied from the reservoir to the bottom of the boiler through a small pipe 18 extending obliquely upward to the reservoir. Heat insulating material 19 fills the space between the boiler and casing 15 and extends beneath the boiler in a rectangular casing member 20 which is secured to the bottom of the reservoir. The top of the boiler 16 is open for the escape of steam and the vaporized inhalant, when the latter is used, and a removable extension member 21 is provided for directing the vapor upward, out of contact with the housing. Surrounding the boiler and spaced from the casing 15 is an annular catch basin 22 adapted to guard the insulating body 19 from any overflow or spillage from the boiler.

An electric heater 23 of the immersion type is mounted near the bottom of the boiler 16 and has a tubular neck portion 24 which extends out through a notch in the upper edge of the boiler and contains the circuit wires. This neck portion is removably held in place by a spring clip 25 attached to the top of the reservoir and flexible circuit wires 26 extend from the clip to a terminal plug 27 for making the connection with a source of current supply. As best shown in Figs. 2 and 4, current supply wires 28 are extended through the reservoir from the bottom thereof in a tube 29. From the upper end of this tube the wires branch to an electric control switch 30 and a plug member 31. Another circuit wire 32 extends from said plug member to the switch. The switch 30 and plug member 31 are mounted on a sheet metal bracket 33 secured to the top of the reservoir. To operate the switch I provide a small lever 34 pivotally mounted on the bracket 33 by a pin 35. This switch lever is actuated by a float 36 in the reservoir having a substantally vertical rod 37 connected at its upper end to the lever 34, a tubular guide 38 being provided for the rod 37. This guide is fastened to the top of the reservoir and projects downward therefrom to limit upward movement of the float 36 so that the latter is normally confined in a position near the bottom of the tank. Upon the substantial exhaustion of the water from the reservoir, the float 36 drops and operates the rod 37 and lever 34 to open the switch 30. The latter is so designed as to require but slight movement for the opening and closing of the circuit.

An outer housing, indicated generally by the numeral 39, has a top 40 spaced upward from the top of the reservoir and side walls 41 and 42 respectively spaced from the corresponding walls of the reservoir. This housing extends down to the feet 14 on all sides and is removably attached to the reservoir by tapped studs 43 and bolts having knobs 44. The studs 43 are rigidly fastened to the walls 7 respectively of the reservoir so as to register with openings in the walls 42 of the housing for the attaching bolts. Downward movement of the housing is limited by a pair of small angle bars 45 fastened to the legs 13 respectively and pairs of angle members 46 fastened to the walls 42 of the housing.

To facilitate carrying the vaporizer about, handles 47 are provided on the end walls 42. Directly above the closure 12 for the reservoir the housing 39 is provided with an opening and a door 48 for closing the latter. As a guide for filling the reservoir a gauge finger 49 is arranged to project where it is visible through the openings for the door 48 and closure 12. The top 40 of the housing is provided with a central opening to receive the outlet extension 21 of the boiler and an annular recess 50 is formed in the housing adjacent to this opening.

For operation the reservoir is filled to the level of the gauge finger 49 through the openings for the door 48 and closure 12 and water flows into the boiler 16 through the pipe 18 to a level corresponding to that in the reservoir. A suitable quantity of a medicant may be placed in a separate container which is suspended in the boiler where the heat is sufficient to vaporize the medicant or the latter may be poured directly into the water in the boiler. The water in the reservoir causes the float 36 to actuate the switch 30 to closed position and through the connections hereinbefore described, current is supplied through the wires 28 and is conducted to the immersion heater 23. This heats the water in the boiler to the boiling temperature and gradually vaporizes and discharges the contents through the extension 21.

High efficiency is obtained by my arrangement for thoroughly insulating the boiler from the reservoir and water contained therein so that the radiant heat dissipated into the room is minimized. Danger of burns caused by contact with the boiler or with other hot portions of the apparatus is effectively guarded against by the insulation and location of the boiler within the reservoir and housing, the latter guarding all parts of the heater, reservoir and electrical connections and switch. The device requires no attention except for occasional filling of the reservoir and no harm is done if the water supply is not replenished because the float controlled switch is opened automatically as the water approaches a dangerously low level. The heater 23 is located below the bottom of the reservoir so that upon the exhaustion of the water in the latter, sufficient liquid remains in the boiler to protect the heater against overheating at the time the current is cut off. Periodic removal of the solid deposits or residue from the vaporized liquid is facilitated by my arrangement for detaching the heater and for gaining easy access to all the surfaces of the heater and boiler to which such deposits may adhere.

Having described my invention, what I claim as new and desire to protect by Letters Patent is:

1. In a vaporizer of the class described, a reservoir, a boiler mounted centrally in said reservoir and projecting below the bottom thereof, a body of heat insulating material surrounding said boiler within the reservoir and extending beneath the boiler, a passage connecting the reservoir to the boiler, a heater in the boiler and an outer housing covering the reservoir and having walls enclosing the walls of the reservoir, said housing having openings communicating with the boiler and reservoir.

2. A portable vaporizer comprising, a reservoir having a dish-shaped top and a filling opening in said top, a closure for said opening, a boiler disposed centrally within said reservoir and extending from top to bottom thereof, means insulating said boiler from the reservoir, means for supplying liquid from the reservoir to the boiler, means for heating the contents of said boiler and a housing having a top portion extending above said reservoir and side walls enclosing the sides of said reservoir, said housing having an opening for the discharge of vapor from said boiler and means for removably attaching the housing to the reservoir.

3. A vaporizer comprising, a reservoir, a relatively small boiler disposed within said reservoir, insulated therefrom and projecting below the bottom thereof, means for supplying water to said boiler from said reservoir, an electric heating element positioned below said reservoir in said boiler, a circuit for supplying electric current to said element, an electric switch in said circuit, a float in said reservoir and means connecting said float to said switch for opening the latter upon the substantial exhaustion of the supply of water in said reservoir.

4. A portable vaporizer comprising, a reservoir having a normally closed top and walls, a relatively small boiler disposed centrally within said reservoir and insulated from the top, walls and contents of said reservoir, means for supplying water from the reservoir to the boiler, means for vaporizing the contents of said boiler, the top of said reservoir having an opening for the discharge of vapor from the boiler and a shallow catch basin surrounding said opening.

5. A portable vaporizer comprising, a rectangular reservoir, a casing for a boiler extending from top to bottom of said reservoir within the same and in spaced relation to the walls thereof, a boiler spaced from said casing within the same and extending below the bottom of said reservoir, a body of heat insulating material between said boiler and casing, said reservoir having a normally closed top, a housing enclosing the top and sides of the reservoir and having an opening communicating with the top of said boiler for the discharge of vapor therefrom, an electric heater in the boiler below the bottom of the reservoir, a switch for controlling said heater mounted within said housing, a float in the reservoir and means connecting said float to said switch for opening the switch upon the reduction of the water in the reservoir to a predetermined level.

6. A portable vaporizer comprising, a rectangular reservoir, a casing for a boiler extending from top to bottom of said reservoir within the same and in spaced relation to the sides thereof, a boiler spaced from said casing within the same and extending below the bottom thereof, a body of heat insulating material between said boiler and casing and extending beneath said boiler, said reservoir having a top opening, a dish-shaped top on said reservoir arranged to drain into said opening, a housing enclosing the top and side walls of said reservoir in spaced relation thereto and having an outlet for vapor communicating with the top of said boiler, an electric heater in the boiler below the bottom of the reservoir, a switch for controlling said heater mounted within said housing, a float in the reservoir and means connecting said float to the switch for opening the latter upon the reduction of the water in the reservoir to a predetermined level.

HARLEY CHRISTENSEN.